UNITED STATES PATENT OFFICE.

PETER C. RITCHIE, OF NEW YORK, N. Y.

TREATING BUCKRAM AND OTHER FIBROUS SUBSTANCES WITH STARCH.

SPECIFICATION forming part of Letters Patent No. 332,439, dated December 15, 1885.

Application filed April 27, 1885. Serial No. 163,654. (No specimens.)

*To all whom it may concern:*

Be it known that I, PETER C. RITCHIE, a citizen of the United States, residing at New-York, in the county of New York and State of New York, have invented certain new and useful Improvements in Treating Buckram and other Fibrous Substances with Starch, of which the following is a specification.

My invention relates to the treatment of buckram and other fibrous or textile material for the purpose of stiffening the same; and it consists, essentially, in coating the material with a solution of raw starch and then exposing it to the action of dry steam, as hereinafter more fully described.

In carrying out my invention I dissolve the raw starch in water, either hot or cold, using about four parts, by measure, of starch to twenty parts, by measure, of water, and then coat the desired fabric or material with this solution one or more times, according to the nature of the material, each coat (when more than one is used) being allowed to dry before the next coat is applied. I now expose the material in a wet state to the action of dry steam a sufficient length of time to "cook" or congeal the starch, so that it becomes fixed on fibers of the material, when the material is ready for use.

For the purpose of applying the solution to the material I use a brush adapted to properly spread the solution, or, in lieu thereof, pass the material through the solution and then between pressure-rollers for removing the surplus, while for steaming the material I pass it over a pipe or reservoir having a slit, through which the steam may escape in a uniform sheet or layer, thereby coming in contact with and permeating every portion of the material, provision being made for drying the steam admitted to the pipe. The purpose of coating and steaming the material, however, can be accomplished by other means which will readily suggest themselves to a skilled mechanic, and I do not therefore wish to be restricted to the precise means described.

My invention can be used to advantage in the treatment of buckram, and especially that class of buckram commonly known as "net," the same having open meshes; and in the treatment of this material I have found the proportions of starch and water above named to answer well in practice, hot water being used and care being taken in applying the solution to leave the meshes open. Said proportions, however, may be varied, whether for buckram or other material, without departure from my invention.

In defining the scope of my invention I would remark that the starch hitherto used for stiffening has invariably been cooked before its application to the material, whereas I use raw starch and cook the same after such application, or while it is upon the material, the advantage of which is that the strength or stiffness of the material is increased, due to a superior adhesion of the starch to the fibers of the material, and also that in the case of net it is made practicable to leave the meshes open—a condition which the previously-cooked starch does not permit without great difficulty, if at all.

The use of steam for cooking the starch on the material is very important, since neither the starch nor the material is liable to be injured by that medium.

By the term "starch" I mean to include any flour-like substance, however prepared, which is capable of being fixed on the fiber of the material, as herein described.

What I claim as new, and desire to secure by Letters Patent, is—

The within-described process of treating buckram and other fibrous or textile material for stiffening purposes, which consists in coating the material with a solution of raw starch and then exposing it to the action of dry steam, thereby cooking the starch and causing it to combine with the fibers of the material, as set forth.

In testimony whereof I affix my signature in presence of two witnesses.

PETER C. RITCHIE.

Witnesses:
FRANCIS CLARE BOWEN,
CHAS. WAHLERS.